(12) United States Patent
Miller et al.

(10) Patent No.: US 7,640,552 B2
(45) Date of Patent: Dec. 29, 2009

(54) MULTIMEDIA FILTER RESILIENCE

(75) Inventors: Kristen Miller, Kirkland, WA (US);
Brian James Walker, Redmond, WA (US); Gareth Alan Howell, Bothell, WA (US); Ian Cameron Mercer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 10/976,562

(22) Filed: Oct. 29, 2004

(65) Prior Publication Data

US 2006/0095850 A1 May 4, 2006

(51) Int. Cl.
G06F 9/54 (2006.01)
G06F 15/16 (2006.01)
(52) U.S. Cl. .................... 719/320; 709/226
(58) Field of Classification Search ............ 719/320; 709/231; 345/473
See application file for complete search history.

(56) References Cited

U.S. PATENT DOCUMENTS

| | | | |
|---|---|---|---|
| 5,907,704 A | | 5/1999 | Gudmundson et al. |
| 5,913,038 A | * | 6/1999 | Griffiths .................. 709/231 |
| 6,205,492 B1 | | 3/2001 | Shaw et al. |
| 6,209,041 B1 | | 3/2001 | Shaw et al. |
| 6,212,574 B1 | | 4/2001 | O'Rourke et al. |
| 6,243,753 B1 | | 6/2001 | Machin et al. |
| 6,601,112 B1 | | 7/2003 | O'Rourke et al. |
| 6,898,799 B1 | * | 5/2005 | Jarman .................... 725/25 |
| 2002/0099861 A1 | * | 7/2002 | Miller et al. ............. 709/310 |
| 2003/0146915 A1 | * | 8/2003 | Brook et al. ............. 345/473 |
| 2003/0192044 A1 | * | 10/2003 | Huntsman ............... 725/25 |
| 2003/0237091 A1 | | 12/2003 | Toyama et al. |
| 2004/0189694 A1 | | 9/2004 | Kurtz et al. |
| 2006/0036568 A1 | | 2/2006 | Moore et al. |
| 2007/0220580 A1 | | 9/2007 | Putterman et al. |

FOREIGN PATENT DOCUMENTS

JP 2001-338459 12/2001

OTHER PUBLICATIONS

Bennett, E., "Proscenium: A Framework for Spatio-Temporal Video Editing," International Multimedia Conference, Proceedings of the Eleventh ACM International Conference on Multimedia, 2003, pp. 177-184, Berkeley, CA.
Ashmawi, W., "On the Impact of Policing and Rate Guarantees in Diff-Serv Networks: A Video Streaming Application Perspective," Proceedings of the 2001 Conference on Applications, Technologies, Architectures, and Protocols for Computer Communications, 2001, pp. 83-95, San Diego, CA.

* cited by examiner

Primary Examiner—Hyung S Sough
Assistant Examiner—Abdou K Seye
(74) Attorney, Agent, or Firm—Senniger Powers LLP

(57) ABSTRACT

Providing resiliency to a multimedia application. A list of filters associated with the multimedia application is identified. It is determined if one or more filters of the identified list of filters are suitable for the multimedia application. The one or more filters are disabled if the one or more filters are determined to be unsuitable for the multimedia application. The one or more filters of the list of filters may also be presented to a user of the multimedia application as a function of suitability of each of the list of filters for the multimedia application. The user is allowed to manage the presented one or more filters.

32 Claims, 9 Drawing Sheets

FIG. 3

| GENERAL | ADVANCED | COMPATIBILITY |

VIDEO FILTERS

TO INCREASE THE COMPATIBILITY OF THE MULTIMEDIA APPLICATION WITH OTHER VIDEO PROGRAMS, YOU CAN DISABLE VIDEO FILTERS THAT HAVE BEEN INSTALLED BY OTHER VIDEO PROGRAMS. CHANGING THESE SETTING DO NOT AFFECT OTHER PROGRAMS THAT ARE INSTALLED ON YOUR COMPUTER.

IF YOU ARE EXPERIENCING PROBLEMS WITH A SPECIFIC VIDEO FILTER, CLEAR THE CHECK BOX TO DISABLE IT IN THE MULTIMEDIA APPLICATION.

| | NAME | VERSION | PATH |
|---|---|---|---|
| ☐ | ANTI-FREEZE | 4.11 | C:\PROGRAM FI...\AX.DLL |
| ☒ | <FRIENDLY NAME... | 1.24 | C:\<DIRECTORY>\..\FN.DLL |
| ☐ | BLACKLIST FILTER | 5.9 | C:\BADFILEDR\,,]\BF.DLL |

LEARN MORE ABOUT <u>VIDEO FILTERS ON WEB SITE A</u>

CLICK RESTORE DEFAULTS TO SET THE LIST OF VIDEO FILTERS THAT ARE ENABLED OR DISABLED TO THE ORIGINAL SETTINGS.

| RESTORE DEFAULTS |

| OK | CANCEL |

MULTIMEDIA FILTER RESILIENCE

TECHNICAL FIELD

Embodiments of the present invention relate to the field of multimedia data processing. In particular, embodiments of the invention relate to improving reliability and stability of multimedia applications that use filters, objects and/or transforms to process multimedia data.

BACKGROUND OF THE INVENTION

Presently, computer users desire a computer system that supports a presentation of multimedia data, including graphic, audio, and imaging information. The popularity of multimedia presentations has encouraged the development of a variety of multimedia formats, such as compressed video (e.g., Moving Picture Experts Group (MPEG)), uncompressed video, compressed audio, and uncompressed audio. Earlier multimedia systems were compatible with a limited set of data formats and typically operated in a uniform manner to play a video and/or audio stream.

Later multimedia systems used replaceable sections within a rigid format to handle more than one type of multimedia data format. The replaceable sections represented functional components for processing multimedia streams. The functional components typically included a file reader, a data stream splitter to split video and audio data streams, a decoder for decoding each data stream, and a renderer for displaying the video stream and presenting the audio stream. The default file reader might be replaceable with a different one to support the reading of a different file format. Likewise, the decoder was replaceable to allow a different encoding technique, and the renderer was replaceable to vary the presentation of the video and audio streams.

Although the sections of these multimedia systems were replaceable, the processing of multimedia data has a fixed format and ordering. For example, a data stream splitter followed a file reader, a decoder was placed before the renderer, and so forth. It was difficult to disable or bypass one or more of the ordered functions of this structured system to perform complex multimedia tasks. For example, this rigid format prevented the simple combination of two files, each including a video stream, to produce a "merged" video effect.

To handle the wide variety of data formats and to perform complex processing tasks, a flexible multimedia system has been designed to automatically combine software components, called "filters," into a graph comprising a chain or chains of filters. This system typically constructs a "filter graph" by connecting the output of one filter to the input of the next filter to create a data system to allow, for example, splitting and merging of data streams. By connecting filters together via a graph mechanism, it is possible to perform complex operations more easily than other structured multimedia architectures. The range of processing tasks that filters of a graph may perform is greater than tasks performed by a multimedia architecture having a rigid format.

Some existing multimedia environments allow for the automatic creation of a filter graph given an input type and a desired output type. There may be combinations of filter graphs that satisfy a given input/output type (e.g., two filters may have the same inputs and outputs). When creating a filter graph, these multimedia environments search through a list of filters that satisfy a given filter graph and picks a filter for loading to the filter graph. However, it is possible that the filter loaded to the filter graph has not been tested against a multimedia application during development. Furthermore, some multimedia environments also allow filters to have "merits," which specify a priority order for which the filters are to be loaded. Thus, when these multimedia environments attempt to create a filter graph, they search for and load filters that have higher merits. One problem associated with such merit figures, however, is that poorly designed filters are often mistakenly given a higher merit.

Furthermore, some multimedia applications such as editing applications place more stress levels on filters since they process transitions between media clips that desire a simultaneous decoding of two clips and a mathematical combination of resulting frames. In particular, these multimedia applications may invoke filters developed by third parties during preview and publication of a video/audio timeline. These third-party filters may not have been tested against the multimedia applications. Moreover, some of these third-party filters, as well any filter which does not take into account concurrent instances, are designed for Digital Versatile Disc (DVD) playback applications that do not desire a simultaneous decoding of different clips and thus are not written to have multiple instances called concurrently. In addition, an automatic graph builder may add filters which should not be part of the graph, but because of the merit figure assigned to the graphs these filters are inserted into the graph. Accordingly, crashes in multimedia applications caused by third-party filters have become a leading cause of dissatisfaction among computer users.

Given the number of different third-party filters available, it is likely that on a given environment, there are some corrupt filters or filters that have not been tested for different multimedia applications. These filters may cause a multimedia application to crash. Often, these filters are not integral for a proper operation of the applications, and excluding them from a filter graph may improve the reliability and stability of the applications. However, it may still be desirable that multimedia environments allow third-party filters to be included in the creation of filter graphs so that the environments may process new coder/decoders (codecs) developed by third parties. Thus, it may not be feasible to disable filter graphs or to disallow third-party filters completely. Also, some application features may desire to plug third-party transitions and effects into a video/audio timeline.

Accordingly, a solution that effectively improves reliability and stability of a multimedia application is desired.

SUMMARY OF THE INVENTION

Embodiments of the invention overcome one or more deficiencies in the prior art by providing, among other things, improved reliability and stability of multimedia applications that utilize multimedia filters. An embodiment of the invention excludes filters (e.g., third-party filters) that do not function properly in an application program from a filter graph to improve reliability and stability of the application program. According to this embodiment of the invention, the application program maintains a list of known-bad filters and a list of known-good filters. One embodiment of the invention disables the known-bad filters in the application program and enables the known-good filters in the application program. Embodiments of the invention also provide a mechanism for constructing and updating these lists and for interacting with a filter graph manager such that a constructed filter graph excludes known-bad filters and filters that are otherwise disabled. In addition, a user interface (UI) allows a user of the application program to disable a filter that may cause a problem in the application program or to enable a particular filter. Thus, this UI thus allows the user to manage filters by changing their disabled/enabled states. Moreover, according to an embodiment of the invention, the UI does not present filters that are desired for a correct operation of the application program to prevent the user from disabling such desired filters.

Another embodiment of the invention provides automatic classification and disabling of corrupt filters. Accordingly, embodiments of the invention allow efficient analysis of filter performance and effective management of filters. In yet another embodiment of the invention, a filter graph pipeline is a process separate from a main application process to provide streamlined user experience.

In one form, the invention comprises a method of providing resiliency to a multimedia application. The method comprises: identifying a list of filters associated with the multimedia application, determining if one or more filters of the identified list of filters are suitable for the multimedia application, and disabling the one or more filters if the one or more filters are determined to be unsuitable for the multimedia application.

In another form, the invention is a system for providing multimedia filter resiliency. The system comprises a memory area for storing data regarding a list of filters and a multimedia application for determining if one or more filters of the list of filters are suitable for execution. The multimedia application is configured to disable the one or more filters if the one or more filters are determined to be unsuitable for execution.

In another form, the invention is one or more computer-readable media having computer-executable components for providing multimedia filter resiliency. The computer-readable media comprises a memory component for storing data regarding a list of filters and an application component for determining if one or more filters of the list of filters are suitable for execution. The application component is configured to disable the one or more filters if the one or more filters are determined to be unsuitable for execution.

In another form, the invention is a method of providing resiliency to a multimedia application. The method comprises: identifying a list of filters associated with the multimedia application, presenting one or more filters of the identified list of filters to a user of the multimedia application as a function of suitability of each of the identified list of filters for the multimedia application, and receiving a selection from the user for managing the presented one or more filters.

In another form, the invention is a system for providing multimedia filter resiliency. The system comprises: a multimedia application for processing multimedia data, a memory area for storing data regarding a list of filters associated with the multimedia application, a filter graph manager for constructing a filter graph from the list of filters in response to a user executing the multimedia application, and a user interface for presenting one or more filters of the list of filters to the user as a function of suitability of each of the list of filters for the multimedia application, the user interface further being configured to receive a selection from the user for managing the presented one or more filters.

Computer-readable media having computer-executable instructions for performing a method of providing resiliency to a multimedia application embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIG. 3 is a block diagram illustrating an exemplary user interface for a user to manage a filter according to one embodiment of the invention.

Corresponding reference characters indicate corresponding parts throughout the drawings.

DETAILED DESCRIPTION OF THE INVENTION

Exemplary Environment

Figure 1:
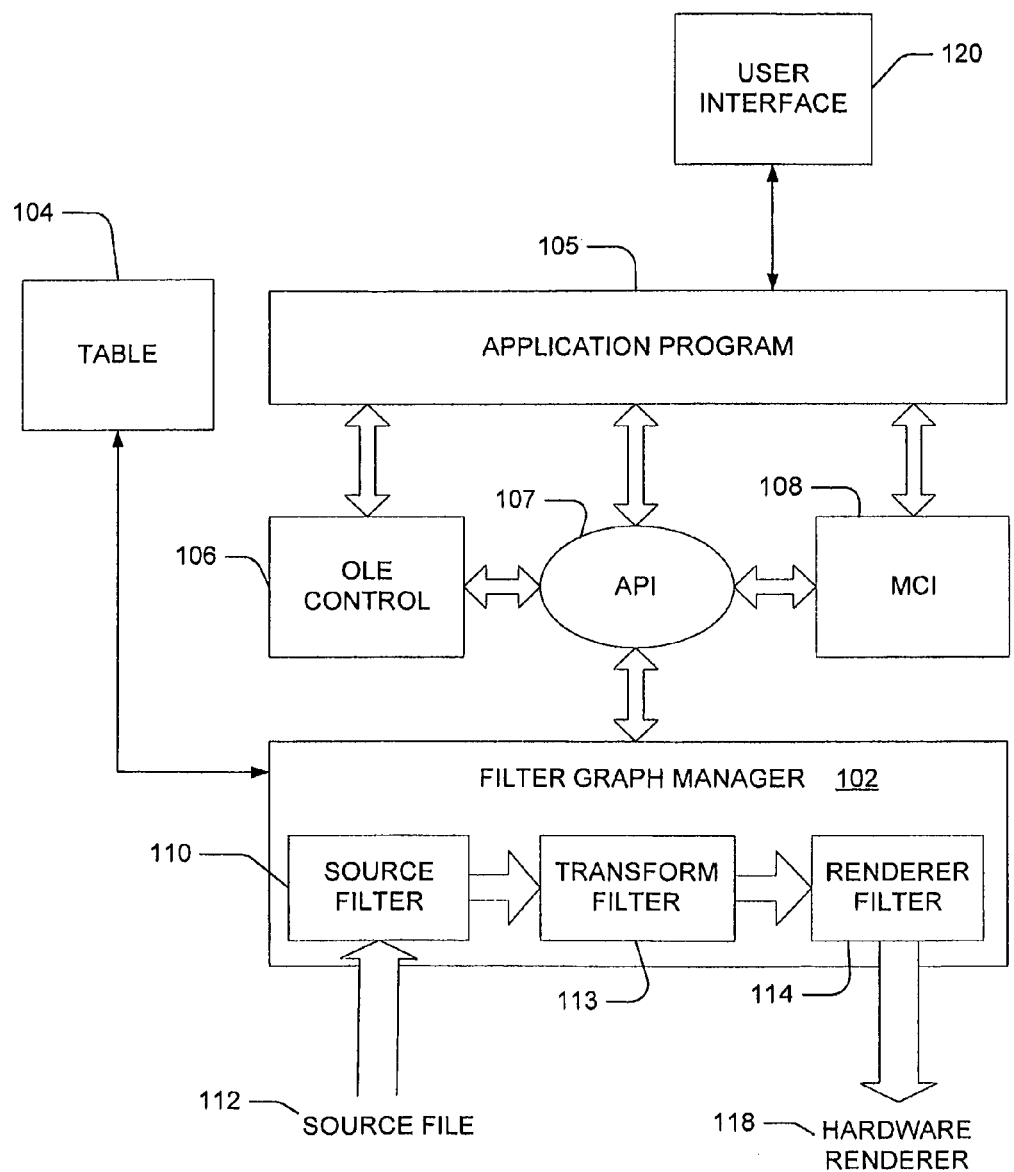
FIG. 1 is a block diagram illustrating an exemplary environment (prior art) in which embodiments of present invention may be utilized.

Referring first to FIG. 1, a block diagram illustrates one example in the prior art of a suitable environment in which embodiments of the invention may be utilized. According to an embodiment of the invention, multimedia data may be controlled and processed by using modular functional components called filters (e.g., Association for Computing Machinery (ACM) codecs, DirectXB Transforms (DXTs), DirectXB Media Objects (DMOs), and Media Foundation Transforms (MFTs)), connected in a filter graph, for processing the multimedia data. For example, filter graphs may be constructed to implement video capture, control of remote devices, animation sequencing, and video/audio recording and editing.

Figure 2:
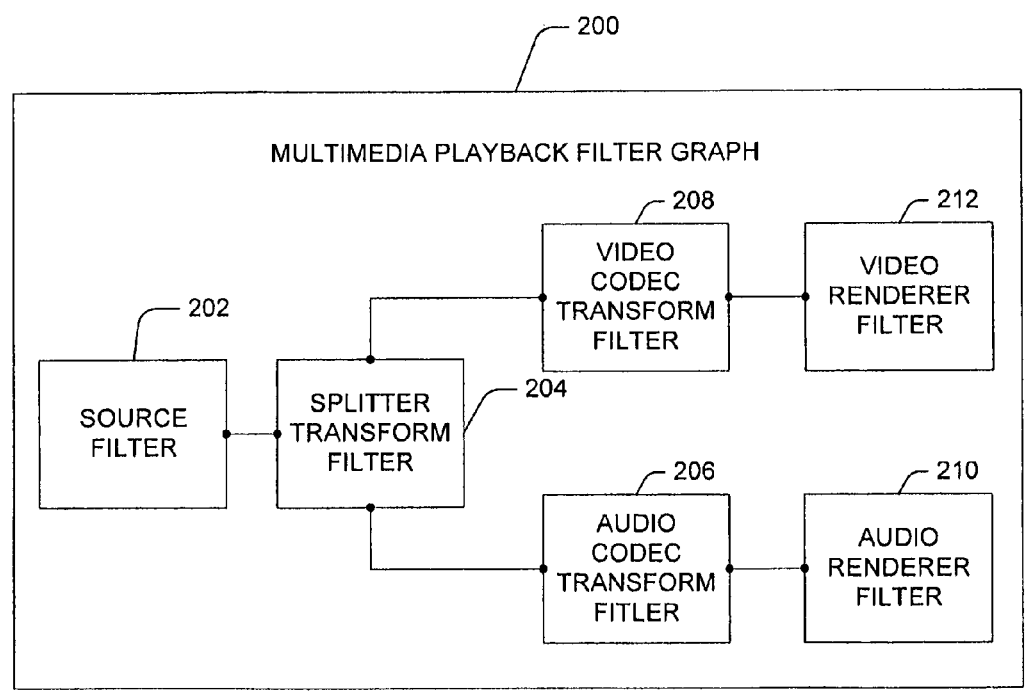
FIG. 2 is a block diagram illustrating an exemplary filter graph (prior art) constructed in accordance with an embodiment of the invention.

A filter graph manager 102 as seen in the prior art, also described as a multimedia filter graph module (MFG module), controls the assembly of a filter graph (e.g., as illustrated in FIG. 2). The filter graph manager 102 also manages the flow of data streams within the filter graph by directing the movement of data through the filter components of the filter graph. To support the construction of a filter graph, filter graph manager 102 searches for a configuration of filters that may render a particular media type. When searching for a rendering configuration, filter graph manager 102 uses a filter mapper component (not shown), which first reads a memory area such as a table 104 (e.g., a registry of an operating system) and determines the types of available filter components. Filter manager 102 then attempts to link together or to otherwise connect filter components that may process a corresponding data type until reaching the stage of a rendering filter during assembly of the filter graph. Filter graphs, however, also may be preconfigured, in which case filter graph manager 102 does not search for a configuration.

The table 104, which is maintained as a portion of a registry of an operating system, includes listings defining the characteristics of available filters. Each filter has stored in table 104 a list of major types and sub-types for data streams that it accepts as an input. For each filter, table 104 also includes the number of inputs and outputs and a "Merit" figure. In one embodiment, it is recommended that filters should typically be assigned a high Merit figure if they are quick to load, offer efficient operation, or are common For example, a video renderer filter is assigned a high Merit figure because it is typically used as the last filter in most filter graphs. Sometimes, however, poorly designed filters may be mistakenly assigned a high Merit figure. Table 104 also lists filter combinations that do not work when combined; this information may improve the speed of building a filter graph. By accessing the information in table 104 before selecting of a filter, filter graph manager 102 may efficiently determine if a particular filter may work in the graph, thereby avoiding the possible loading of a particularly poor filter choice. In another embodiment, table 104 may contain an unacceptable/acceptable list for applications, as noted below.

Filter graph manager 102 controls the media stream by allowing an application program 105 (e.g., a multimedia application) or object linking and embedding (OLE) control 106 to specify certain activities, such as starting, pausing, or stopping the media stream, playing for a particular duration or seeking to a particular point in the data stream. Filter graph manager 102 then calls appropriate methods on the filters to invoke them. It also allows filter components to post events that may be retrieved by the application program 105 such that application program 105 may, for example, retrieve status information about some special filter that it has installed.

Filter graph manager 102 also provides a set of application programming interfaces (APIs) 107 to allow communications between the filter graph and application program 105. A program module, such as application program 105, may make a direct call to the interfaces 107 to control the media stream or to retrieve filter events. Alternatively, a program module can use an OLE control 106 for higher-level programming. A subset of commands for a media control interface (MCI) 108 is also available for compatibility purposes.

A filter graph typically comprises a linked collection of filter components of different types. In general, filters components may be categorized into one of three filter types: source, transform, or renderer. For example, filter graph manager 102 controls an exemplary filter graph comprising each of the three types of filters. A source filter 110, which accepts and reads data from a source 112, such as a file stored on a storage medium or information fed via a satellite feed, and introduces it into the filter graph. A transform filter 113 accepts the data from the source filter 110, processes the data, and forwards the processed data to a renderer filter 114. The renderer filter 114 renders the data. Typically, the rendered output is supplied to a hardware renderer or device 118 but potentially may be rendered to any location that accepts media input (such as a filed maintained on volatile memory, flexible disk, hard disk, etc.). It is understood that the filter graph shown in FIG. 1 represents one of numerous possible constructions of filter graphs, and that embodiments of the present invention are not limited to a particular architecture for a filter graph. In particular, any number of transform filters could be present in the graph.

Although three basic types of filters are described above, a filter may represent a combination of filter types. For example, a filter may operate as an audio renderer but also may act as a transform filter by passing through video data. Moreover, transform filters encompass a variety of transformation functions, including splitting a single data stream into multiple data streams, i.e., a splitter, and merging two or more data streams into a single data stream. Specifically, a transform filter may be constructed by combing processing functions.

Filters of a filter graph architecture, such as filters 110, 113, and 114, are implemented to include a predefined set of functions, called methods. Application program 115 calls a method to communicate with a particular filter. Application program 105 (or OLE control 106) may also call methods on interfaces exposed by filter graph manager 102.

Turning now to FIG. 2 for a representative example of the architecture of a typical filter graph, a filter graph 200 supports the processing of compressed video and audio by use of a chain of six filters. Six filters is an exemplary number, and it could be any number of filters. A source filter 202 reads the data from a source file, which is typically maintained on a local or remote storage medium. The source filter 202 outputs source data to a splitter transform filter 204. The splitter transform filter 204 splits the incoming data stream into a pair of data streams, namely video data and audio data streams, and passes these data streams to an audio codec transform filter 206 and to a video codec transform filter 208. The audio codec transform filter 206 decompresses the audio data and outputs a decompressed audio data stream. The video codec transform filter 208 decompresses the video data and outputs a decompressed video data stream. An audio renderer filter 210 renders the decompressed audio data stream to play the audio data via, for example, a speaker (not shown). A video renderer filter 212 accepts and renders the decompressed video data stream to support a display of the video data on, for example, a monitor (not shown). The video renderer filter 212 typically outputs the rendered video data to a hardware renderer, such as a video card, or to an output file maintained on a storage medium. Based on the review of filter types above, source filter 202 represents a source filter; splitter transform filter 204, audio codec transform 206, and video codec transform filter 208 represent transform filters; and audio renderer filter 210 and video renderer filter 212 represent renderer filters. A generic video transform filter (not shown; e.g., a video processing filter) may be used in place of or in addition filters 208 and 210 in configurations in which effects are part of the playback graph.

A filter graphs works with data representing a variety of media types, each type characterized by a data stream that is processed by filters components of the filter graph. A filter positioned closer to a renderer filter than another filter in the flow of a data stream is said to be downstream from that filter. For example, a transform filter, such as splitter transform filter 204, is downstream from a source filter, such as source filter 202. Likewise, a filter closer to the source of the data than another filter is said to be an upstream filter. Data representing a media type typically flows through the chain of filters in a downstream direction, but other information may travel in an upstream direction, including timing and synchronization information.

Referring again to FIG. 1, filter graph manager 102 may use table 104, stored in a memory storage device, to support the construction of a filter graph comprising a chain of filters. Filter graph manager 102 typically constructs the filter graph in stages based on the information stored in table 104 about the available filters. For example, in response to selecting a suitable reader filter to read the source file, filter graph manager 102 may select, load, and connect filters in a successive fashion until rendering of each data stream in the source file.

To render a source file, such as source file 112, filter graph manager 102 builds a filter graph comprising connected filter components, such as filters 110, 113, and 114. Filter graph manager 102 first examines source file 112 to determine the file type and the type(s) of data stored in source file 112. A determination of the type of source file allows filter graph manager 102 to assign a media type to a corresponding data stream of the source file. To determine the file type, filter graph manager 102 accesses table 104 and obtains instructions to read certain portions of source file 112 at particular offsets and to compare the accessed data of source file 112 with particular values stored in table 104. A match of the accessed data portion to stored values results in a determination of the type of source file (and its corresponding media type). Based on the media type and the location of the file (local or remote storage medium), filter graph manager 102 selects an appropriate file reader filter, such as source filter 110, from information maintained in table 104. Filter graph manager 102 then instructs a file loader to load the file reader filter. Filter graph manager 102 then begins to read source file 112.

Filter graph manager 102 then determines the outputs of the present filter, in this case, source filter 110. For each output, filter graph manager 102 examines entries in table 104 to locate a filter that may accept the output as an input. It is understood that there may exist several filters that perform similarly well for a particular stage of the operation but that deliver results in slightly different formats. If there are no outputs then the filter graph is complete. Of the listed filters, which are compatible with the data stream to be processed and may accept the output of the present filter as input, filter graph manager 102 selects an available filter with the highest Merit figure. An "available" filter is a filter that is maintained on a storage medium and available for loading and use. Filter graph manager 102 arranges for the loading of the selected filter and a connection of the output of the present filter to the input of the selected filter. If no connection can be found, the filter graph manager may be configured to try every merit filter which is not labeled as unacceptable.

If filter graph manager 102 achieves a successful connection, then filter graph manager 102 examines the newly loaded filter to determine its outputs. Filter graph manager 102 then examines the filter information maintained in table 104, as described above, to select an available filter having an input that matches the output of the newly loaded filter. In turn, filter graph manager 102 completes the tasks described above anew for each selected filter.

In addition to rendering a given file, filter graph manager 102 may start from the output of any given filter and complete that section of the graph. In this case, the process is similar to that described above, except that the operation starts at the appropriate designated point. Also, filter graph manager 102 may instead be requested to connect the output of one filter to the input of another. This operation is again similar to that described above, except that in searching table 104 for filters to use, filter graph manager 102 selects filters that do have at least one output, whereas in the other operation, for filters of the same Merit figure, filter graph manager 102 gives preference to filters that have no outputs.

As discussed, on a given multimedia environment, there may exist some corrupt filters or filters that have not been tested against application program 105. Therefore, such filters may cause application program 105 to function improperly (e.g., application program 105 may crash). Moreover, since some poorly designed filters may have been assigned a high Merit figure, these filter graph manager 102 may load these filters into the filter graph even when they are not desired. Because third parties design some of these filters, filter graph manager 102 may not know which filters may cause problems in application program 105. Accordingly, embodiments of the invention specify a mechanism to provide resiliency to application program 105. As mentioned above, an alternate embodiment may be to have the filter graph manager maintain the list of known acceptable/unacceptable filters per application (e.g., per Movie Maker or Windows® Media Player) or per application type (e.g., per playback, editing, etc.).

According to an embodiment of the invention, a UI 120, as illustrated in FIG. 1, allows a user to decide which filters to enable or disable in application program 105. In this embodiment of the invention, table 104 (or another table) maintains an acceptable list (or known-good list) that specifies filters that are desired for a proper operation of application program 105 and that have been tested against application program 105. Such filters may include filters that application program 105 uses on a clean install of the operating system. Filters that are included in the acceptable list are excluded from UI 120 such that the user may not disable them. Table 104 also maintains an unacceptable list (or known-bad list) that specifies filters that may cause problems in application program 105. Filters specified in the unacceptable list are disabled in application program 105 (e.g., excluded from a filter graph) by default but are presented in UI 120 to allow the user to manage their enabled/disabled states. Table 104 further maintains a list of filters that application program 105 has previously encountered or used. Such filters are enabled in application program 105 (e.g., included in a filter graph) by default but are presented in UI 120 to allow the user to manage their enabled/disabled states. Other filters that may not cause problems in application program 105 and have not been encountered or used by application program 105 are not presented in UI 120. Specifically, filters that have not been previously encountered may not shown in order to optimize the UI and improve usability.)

Application program 105 is configured to remove filters that have been disabled from the automatically created filter graph. Specifically, application program 105 intercepts API calls (e.g., at both preview and publication of a video/audio timeline) that filter graph manager 102 made to load filters from table 104 or from executable routines (e.g., dynamically linked library (DLL)). Thus, table 104 or the executable routines calls application program 105 when filter graph manager 102 attempts to load a filter to the filter graph. Accordingly, application program 105 may check an identifier (e.g., globally unique identifier (GUID)) of the attempted filter against the filter identifiers listed in the unacceptable list. If the identifier of the attempted filter matches a filter identifier in the maintained unacceptable list, then application program 105 does not pass the API calls to the executable routines or table 104. This prevents filter graph manager 102 from loading the filter to the filter graph and causes filter graph manager 102 to search for a fallback filter. By handling the blocking at this level, embodiments of the invention also prevent the executable routines or the filter from corrupting an operation of application program 105.

On the other hand, if the identifier of the attempted filter does not match a filter identifier in the unacceptable list, then application program 105 passes the API calls to the executable routines or table 104 for filter manager 102 to load the attempted filter. If the loading succeeds, filter graph manager 102 then adds this filter to the list of filters that application program 105 has encountered or used. As discussed, UI 120 presents to the user those filters that are in the unacceptable list or in the list of filters that application program 105 has encountered or used to allow the user to manage their enabled/disabled states. This keeps the many filters on the system that do not enter the filter graph construction process from showing up in UI 120. Moreover, UI 120 may sort the presented filters in a manner such that filters that have been encountered or used by application program 105 most recently are presented to the user first. Accordingly, UI 120 may present those filters that may have caused a problem in application program 105 last.

FIG. 3 illustrates an exemplary display of UI 120 according to one embodiment of the invention. As shown, UI 120 includes a list-box that presents a list of filters for the user to manage. A filter is presented in UI 120 as either enabled by default or disabled by default. And the user may enable or disable the filter via UI 120 regardless of its default state. UI 120 populates the list-box in one of two ways. First, UI 120 includes unacceptable list filters (i.e., filters in the unacceptable list maintained in table 104) in the list-box. These unacceptable list filters appear in the list-box unchecked (i.e., disabled by default) and are enabled if the user explicitly checks the filters in the list-box. Accordingly, filters that are not desired for a proper operation of application program 105 are disabled by default. For other filters that may cause application program 105 to operate improperly, UI 120 provides an instruction to the user on how to disable these filters as well as on how to upgrade them. The unacceptable list of filters is stored and preserved in the user's system. Moreover, each filter in the unacceptable list has a range of associated version identifiers. However, the filter version displayed in the list-box reflects the current version installed. If the user enables or disables a filter in the list-box (e.g., by checking or unchecking the corresponding checkbox), this setting is preserved for the user between different instances of application program 105.

UI 120 also includes in the list-box those filters that are not in the unacceptable list but are in the list of filters that have been encountered or used by application program 105. Specifically, when a new filter is loaded to the filter graph, UI 120 adds it to the list-box. Such filters appear in the list-box checked (i.e., enabled by default) and are loaded to the filter graph until the user disables them by unchecking the corresponding checkboxes. The enabled/disabled states of these filters are preserved in the user's system. Thus, if the user enables or disables a filter in the list-box (e.g., by checking or unchecking the corresponding checkbox), this setting is preserved for the user between different instances of application program 105. Moreover, each of these filters has a range of associated version identifiers. But the filter version displayed in the list-box reflects the current version installed.

UI 120 also shows a friendly name, a version identifier, and an executable routine path of a given filter displayed in the list-box. For example, a GUID and an executable routine path of a filter form a unique pair of identification. If the GUID/routine path is the same between two filter objects, then the system registers one version of the filter objects at one time. Also, the unacceptable list supports a range of version identifiers that are disabled for each unique GUID/routine path identification. If application program 105 detects that a filter's version has changed, then it determines if the new version falls within the range of versions supported in the unacceptable list. If the new version falls within this range, then it is disabled by default in UI 120. Otherwise, the filter is enabled by default. As discussed, the version identifier shown in the list-box reflects the current version of the filter.

UI 120 also includes a "restore default" option that allows the user to change the filters to their default states. Upon selecting the option, filters in the unacceptable list become disabled and unchecked in UI 120 (e.g., up to the latest updates), regardless of their previous states. In contrast, after the user selects the "restore default" option, filters included in the list of filters that have been encountered or used by application program 105 become enabled and checked in UI 120, regardless of their previous states.

As discussed, the list-box sorts the filters such that filters that have been most recently encountered by application program 105 are presented on top of the list. The user may also click on the friendly name field to sort the filters by name. In an embodiment of the invention, the sort field is not preserved between instances of launching UI 120. Thus, whenever the user launches UI 120 again, the filters are displayed in the order of most recently encountered.

According to one embodiment of the invention, it is possible to update the unacceptable list and the acceptable list via an automatic update program without changing codes of application program 105. Automatically updating the acceptable list prevents filters that properly function within application program 105 from being disabled by the user in UI 120. After the update to the unacceptable list has been provided to application program 105, selection the "restore default" option by the user restores the enabled/disabled states as specified in the latest unacceptable list.

It is possible that third parties will tamper with the unacceptable list and the acceptable list in an attempt to disable various filters within application program 105. Accordingly, embodiments of the invention allow signing the unacceptable list and the acceptable list with a private key and embedding the associated public key in application program 105 to verify the signature.

In yet another embodiment of the invention, table 102 (or another table) maintains a performance history of various filters. For example, whenever application program 105 invokes a particular filter, it is determined if this filter causes application program 105 to crash or to experience other problems. By maintaining such a performance history for this filter with regard to an operation of application program 105, it is possible to determine which filters are likely to cause a problem when filter graph manager 102 constructs a filter graph. Thus, if the performance history indicates that a given filter is likely to cause a problem in application program 105, application program 105 may automatically disable this filter after informing the user and offering the user a change to enable it later.

A central memory area or database may maintain the performance history of a give filter across different users to allow efficient analysis as to if the filter is likely to be causing a problem in application program 105. For example, embodiments of the invention may employ statistical analysis across different users who report the performance of the given filter to determine if the filter belongs to the unacceptable list.

In another embodiment of the invention, a user may submit a report regarding how a given filter is performing in application program 105. From this report, a new unacceptable list and a new acceptable list may be constructed. This submitted report may also serve as the basis of the filter's performance history. Moreover, the unacceptable list and the acceptable list may be automatically updated each time the user submits a new report on the performance of application program 105. Embodiments of the invention may apply this function independently of maintaining a filter performance history.

Embodiments of the invention also allow moving of the filter graph pipeline into a process separate from a process of application program 105 such that a problem occurring in the pipeline does not affect application program 105. This further allows application program 105 to quickly diagnose the problem in the pipeline, disable the filters that it predicts are causing the problem, and restart the pipeline. Moving the filter graph pipeline into a separate process also allows the user to continue running application program 105 after a short interruption despite the problem in the pipeline.

When the pipeline is out of process and data that represents a video/audio timeline is the main process, it is possible to analyze a crash in application program 105 to determine the point of failure in the filter graph. The analysis may point directly to a filter or an executable routine that caused the crash. By combining this data with the time of the last good frame rendered against valid timeline data as well as the performance history of various filters, embodiments of the invention may intelligently inform the user which filter or file may cause a problem in application program 105.

Figure 4:
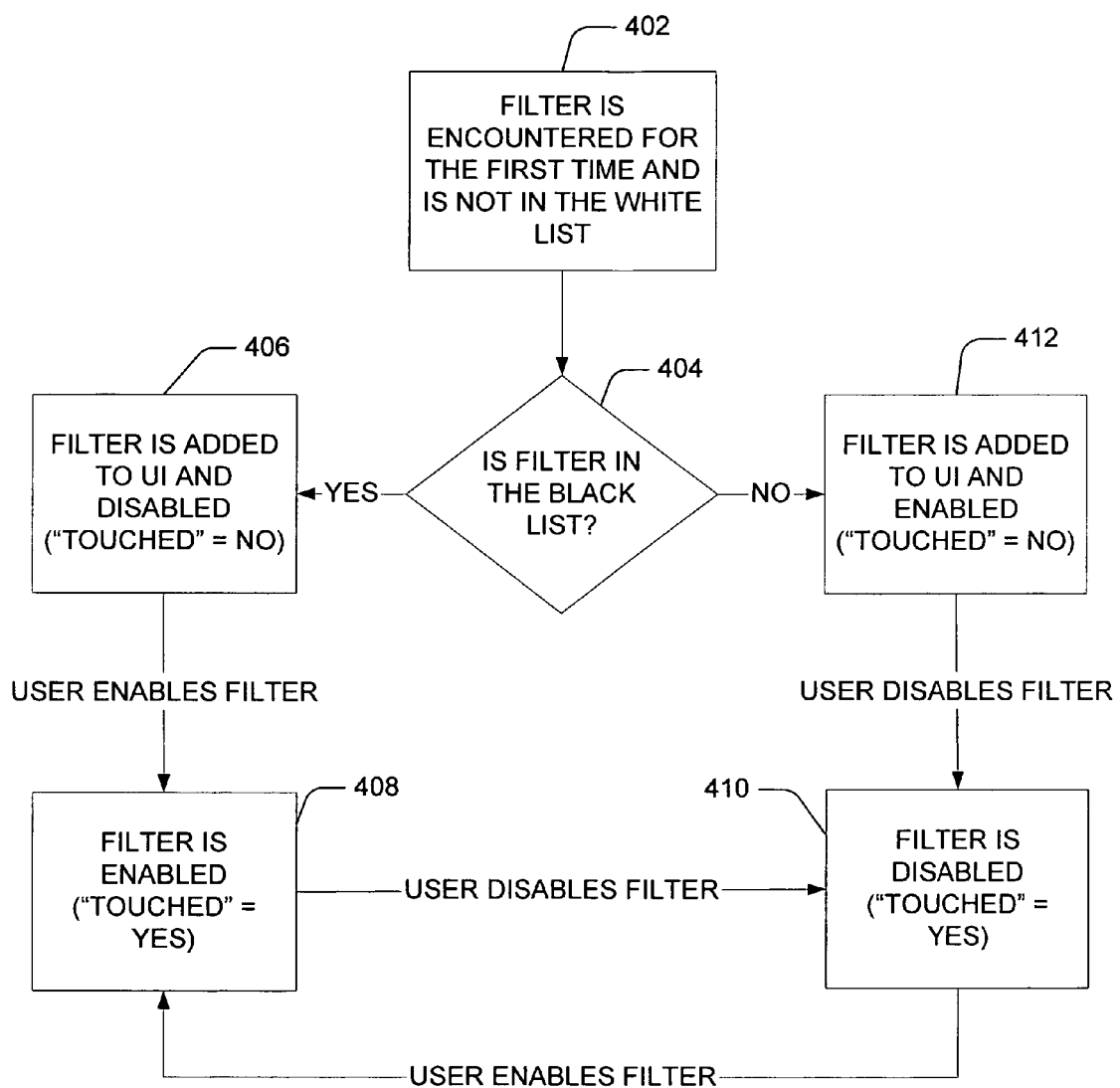
FIG. 4 is an exemplary flow diagram illustrating process flow according to one embodiment of the invention for providing resiliency to a multimedia application.

FIG. 4 illustrates an exemplary process flow for providing resiliency to a multimedia application according to one embodiment of the invention. At 402, a filter, which is not in the acceptable list, is encountered by application program 105 for the first time. At 404, it is determined if this filter is in the unacceptable list. If the filter is in the unacceptable list, it is added to UI 120 and disabled at 406. Each filter has an associated "touched" state, which indicates "yes" if the user has manually managed the filter (e.g., enabling or disabling the filter) and "no" if the user has not yet managed the filter. Thus at this stage, since the user has not yet managed the filter, the touched state of the filter is "no." At 408, after the user selects an option to enable the filter (e.g., by checking a corresponding checkbox in UI 120), the filter becomes enabled. Moreover, the touched state of the filter becomes "yes." If the user then selects an option to disable the filter (e.g., by unchecking the corresponding checkbox in UI 120), the filter becomes disabled again at 410, and the touched state of the filter remains "yes." The user may further enable the filter to return the process flow to 408.

Returning to 404, if the filter is not in the unacceptable list, the filter is added to UI 120 and enabled at 412. At this stage, the touched state of the filter is "no." After the user disables the filter, the filter then becomes disabled at 410, and the touched state of the filter becomes "yes." The user may further change the enabled/disabled state of the filter as described above.

Figure 5:
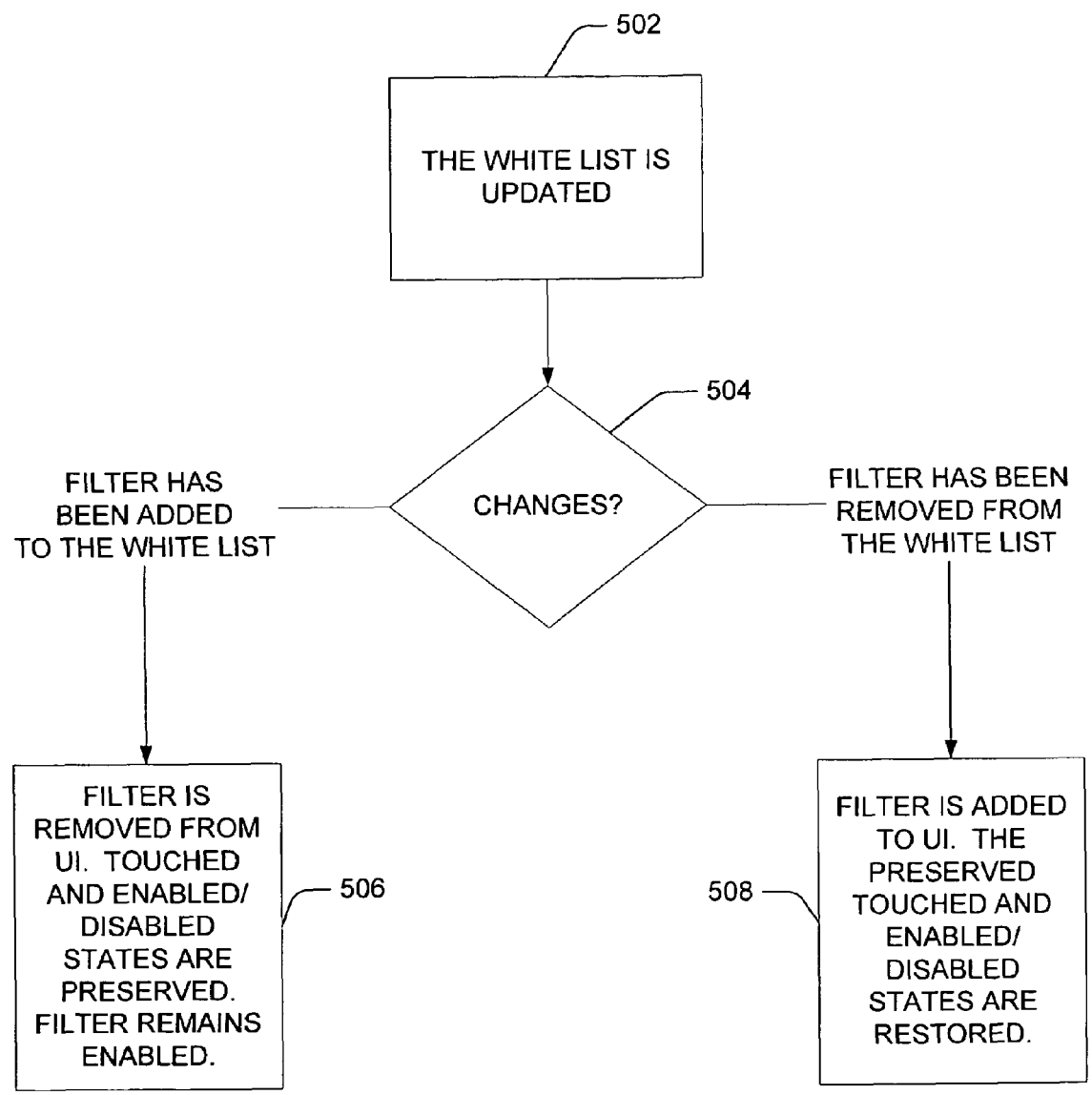
FIG. 5 is an exemplary flow diagram illustrating process flow according to another embodiment of the invention for providing resiliency to a multimedia application.

Referring to FIG. 5, an exemplary process flow for providing resiliency to a multimedia application according to another embodiment of the invention is illustrated. At 502, the acceptable list is updated. At 504, it is determined what changes have been made to the acceptable list. If a filter has been added to the acceptable list, then this filter is removed from UI 120 at 506. Furthermore, the touched and enabled/disabled states of the filter are preserved, and the filter remains enabled. On the other hand, if the changes in the acceptable list indicate that a filter has been removed from the acceptable list, this filter is added to UI 120 at 508. Moreover, the preserved touched and enabled/disabled states of the filter are restored.

Figure 6:
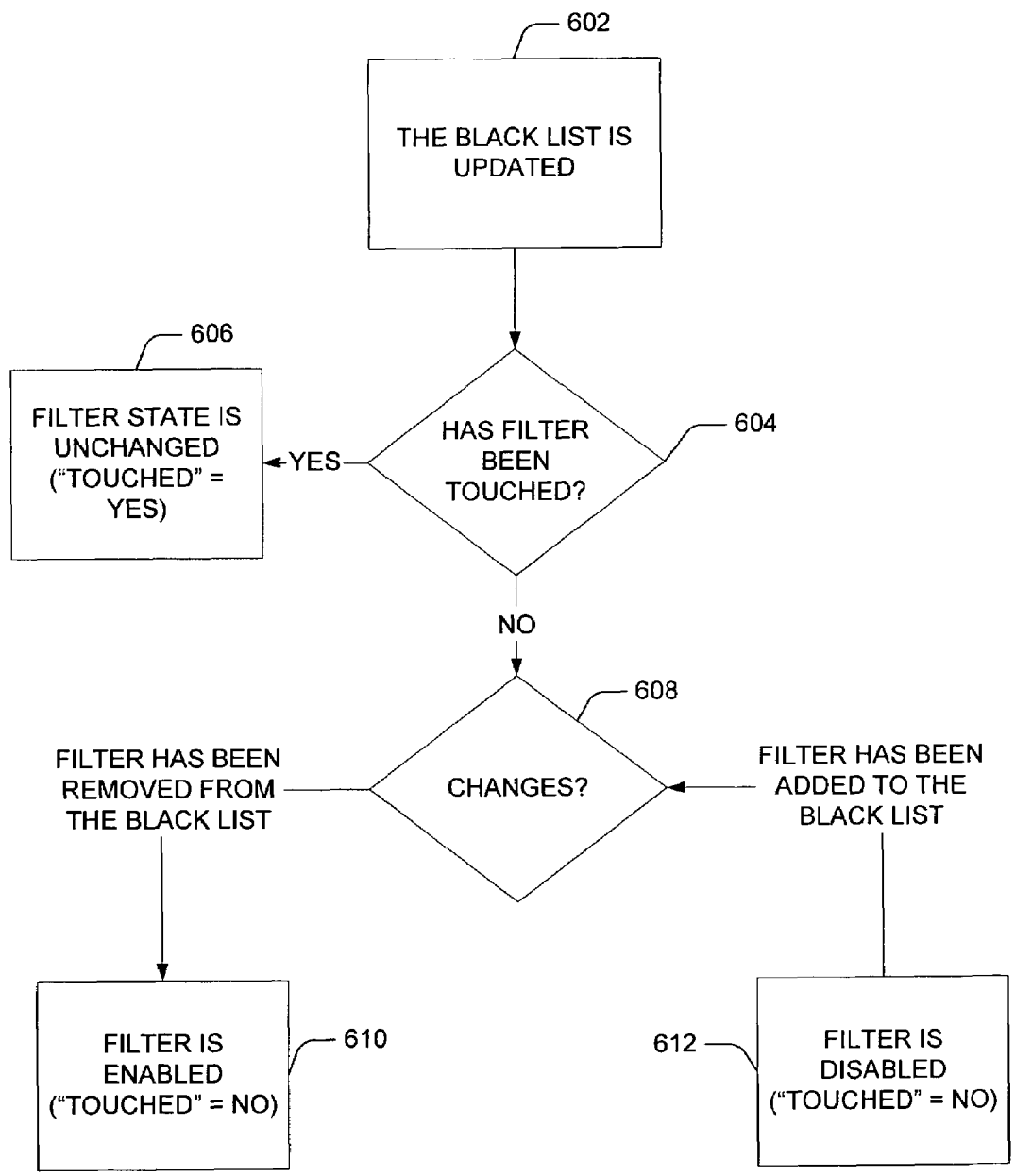
FIG. 6 is an exemplary flow diagram illustrating process flow according to yet another embodiment of the invention for providing resiliency to a multimedia application.

FIG. 6 illustrates an exemplary process flow for providing resiliency to a multimedia filter according to another embodiment of the invention. At 602, the unacceptable list is updated. At 604, it is determined if a filter in the unacceptable list has been touched (i.e., has been managed by the user). At 606, if the filter has been touched, then the enabled/disabled state of the filter remains unchanged. Moreover, the touched state of the filter remains "yes." At 608, if the filter has not been touched, it is determined what changes have been made to the unacceptable list. If a filter has been removed from the unacceptable list, then this filter is enabled at 610. At this stage, the touched state of the filter is "no." On the other hand, if the changes in the unacceptable list indicate that a filter has been added to the unacceptable list, then this filter is disabled at 612. And the touched state of the filter is "no."

In an embodiment of the invention, after the user has enabled a filter in the unacceptable list, it is not disabled by an update to the unacceptable list. However, if a filter initially not in the unacceptable list is enabled, adding this filter to the unacceptable list would disable it. Thus, embodiments of the invention may stop a problem in application program 105 by updating the unacceptable list. But if the user has specifically enabled a filter in the unacceptable list, an update to the unacceptable list does not change the state of this filter.

Figure 7:
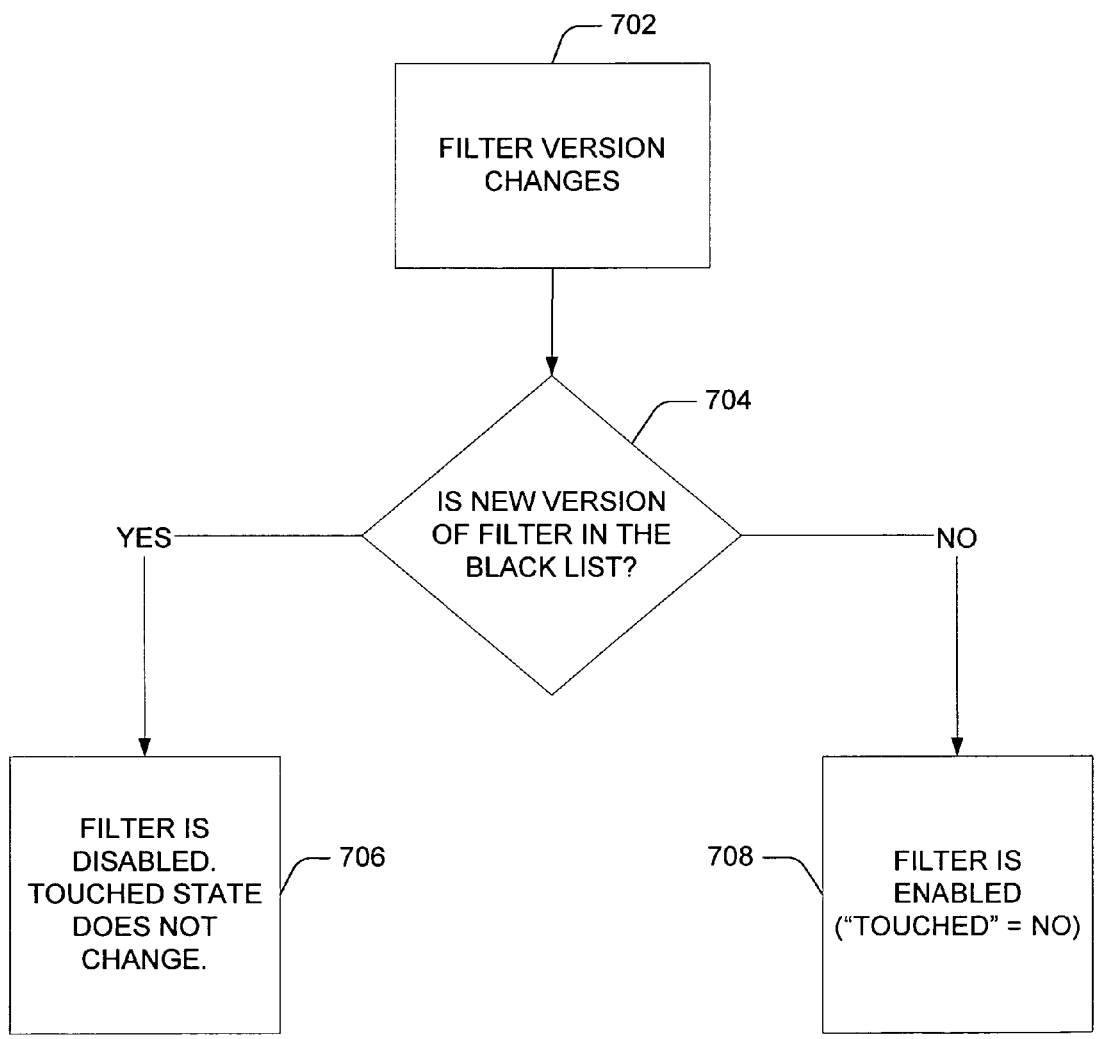
FIG. 7 is an exemplary flow diagram illustrating process flow according to further yet another embodiment of the invention for providing resiliency to a multimedia application.

FIG. 7 illustrates an exemplary process flow for providing resiliency to a multimedia application according to yet another embodiment of the invention. At 702, a filter's version changes (e.g., when the user upgrades the filter). At 704, it is determined if the new version of the filter is in the unacceptable list. At 706, if the new version of the filter is in the unacceptable list, then the filter is disabled. However, the touched state of this filter does not change. At 708, if the new version of the filter is not in the unacceptable list, then the filter is enabled. Moreover, the touched state of the filter is "no."

Figure 8:
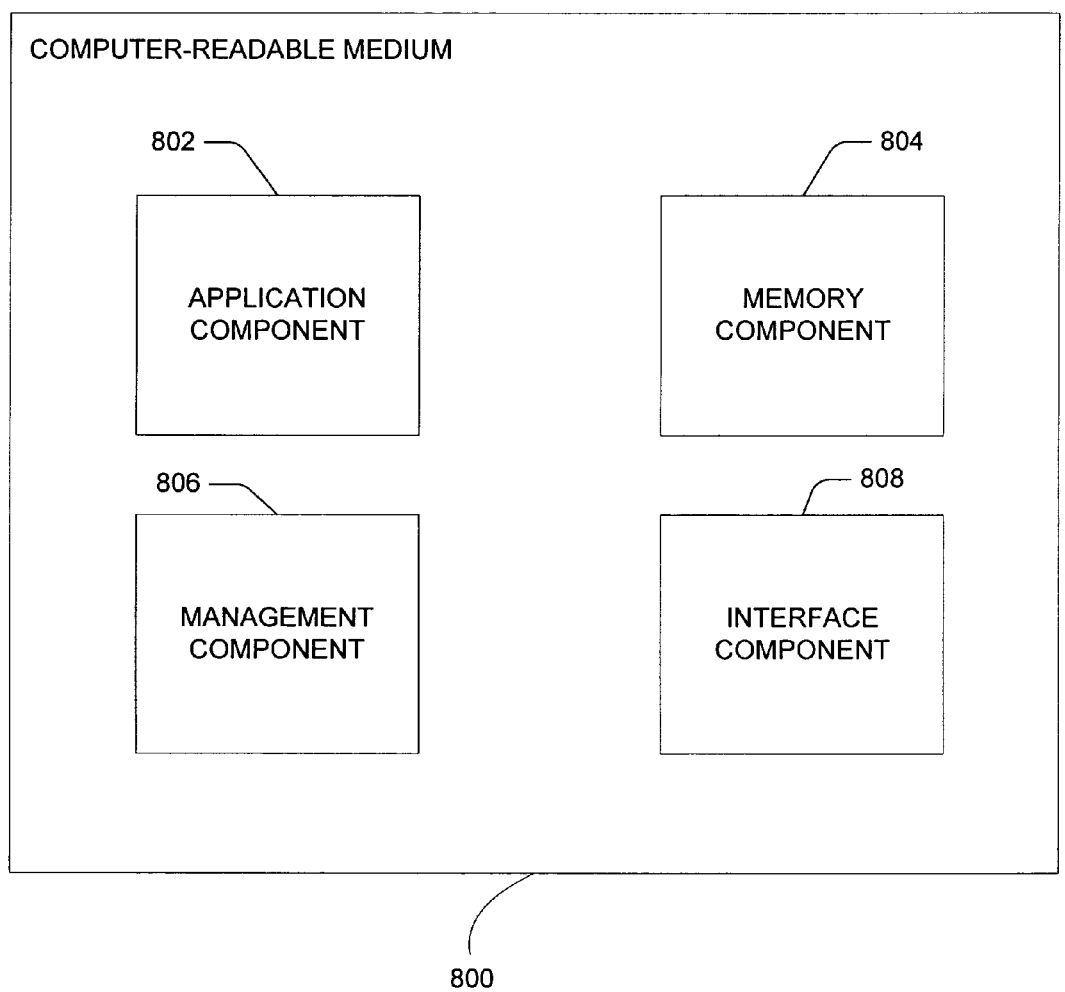
FIG. 8 is a block diagram illustrating another exemplary computer-readable medium according to one embodiment of the invention.

FIG. 8 is a block diagram illustrating an exemplary computer-readable medium 800 according to one embodiment of the invention. As shown, the computer-readable medium 800 includes an application component 802, a memory component 804, a management component 806, and an interface component 808. However, it is contemplated that computer-readable medium 800 may be any quantity of computer readable media and may comprise various combinations of components and functionalities associated with each component.

The application component 802 processes multimedia data. The memory component 804 stores a list of filters (e.g., a source filter, a splitter transform filter, a codec transform filter, a renderer filter, etc.) associated with application component 802. The management component 806 constructs a filter graph from the list of filters in response to a user executing application component 802. The interface component 808 presents one or more of the list of filters to the user as a function of suitability of each filter for application component 802. Interface component 808 is also configured to allow the user to manage the presented filters. For example, interface component 808 is configured to allow the user to enable or disable the presented filters in application component 802.

According to an embodiment of the invention, application component 802 intercepts an interface call made by management component 806 to memory component 804 for loading a filter to the filter graph. Application component 802 then determines if the filter is suitable for application component 802. If the filter is unsuitable for application component 802, application component 802 is configured to prevent the interface call from communicating with memory component 804. In response, management component 806 is configured to load another filter included in the list of filters for constructing the filter graph. If the filter is suitable for application component 802, application component 802 passes the interface call to memory component 804. And management component 806 is configured to load the filter for constructing the filter graph. In addition, application component 802 is configured to access memory component 804 to add the filter to a list of filters (e.g., stored in memory component 804) that have been used by application component 802.

According to an alternative embodiment of the invention, application component 802 is configured to determine if a filter is suitable for execution. If the filter is not suitable for execution, application component 802 is configured to disable the filter (e.g., in response to informing the user that the filter is to be disabled). And interface component 808 allows the user to enable the disabled filter.

Specifically, memory component 804 maintains a performance history of each filter, and application component 802 determines if a filter is suitable for execution based on the maintained performance history (e.g., by employing a statistical analysis of the maintained performance history). Alternatively, interface component 808 may allow the user to submit a report on a performance of a filter, and application component 802 is configured to determine if the filter is suitable for execution based on the submitted report. Memory component 804 may then store the submitted report as a performance history of the filter.

In addition, memory component 804 stores an acceptable list of filters that are desired for a proper operation of application component 802 and an unacceptable list of filters that are unsuitable for application component 802. The acceptable list and the unacceptable list may be generated based on the submitted report. Interface component 808 is configured to present the unacceptable list of filters to the user and to allow the user to manage the unacceptable list of filters. The unacceptable list of filters initially is being presented in interface component 808 as disabled by default. Interface component 808 is also configured to present to the user a filter that has been used by application component 802 and to allow the user to manage the filter. This filter is initially presented in interface component 808 as enabled by default. Moreover, interface component 808 is configured to prevent the acceptable list of filters from being presented to the user and from being disabled.

Figure 9:
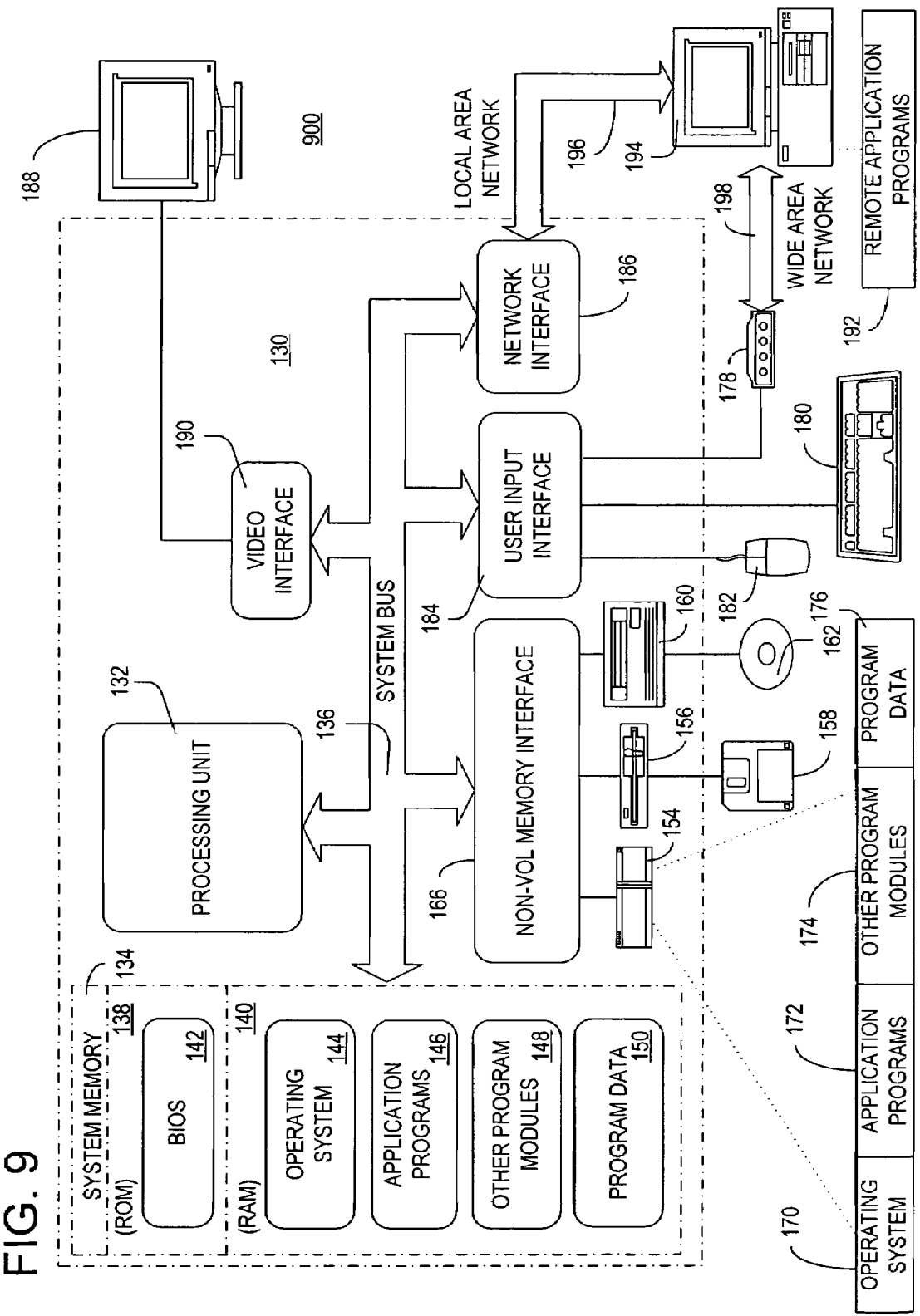
FIG. 9 is a block diagram illustrating an exemplary embodiment of a suitable computing system environment in which one embodiment of the invention may be implemented.

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer readable instructions, data structures, program modules and other data for the computer 130. In FIG. 9, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to provide resiliency to a multimedia application. Computer-executable instructions are configured to identify a list of filters associated with the multimedia application. Computer-executable instructions are also configured to present one or more filters of the list of filters to a user of the multimedia application as a function of suitability of each of the list of filters for the multimedia application. Computer-executable instructions are further configured to allow the user to manage the presented one or more filters.

In another embodiment of the invention, computer-executable instructions are configured to identify a list of filters associated with the multimedia application. Computer-executable instructions are also configured to determine if one or more filters of the identified list of filters are suitable for the multimedia application. Computer-executable instructions are further configured to disable the one or more filters if the one or more filters are determined to be unsuitable for the multimedia application.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of managing multimedia filters for providing filter resiliency to a multimedia application, said method comprising computer-executable instructions for:
   intercepting an interface call for loading one or more filters in response to a user executing the multimedia application;
   identifying filters associated with the multimedia application, said filters being capable of performing one or more of the following functions on multimedia data: accepting, reading, processing and rendering;
   determining if the loaded one or more filters are suitable for the multimedia application;
   disabling the one or more filters if the one or more filters are determined to be unsuitable for the multimedia application, said disabling preventing selection of the disabled one or more filters for constructing a filter graph;
   receiving from a user of the multimedia application a report on a performance of a filter as a performance history of the filter, said report comprising information on whether the filter causes the multimedia application to malfunction; and
   generating, based on the received report and based on the identified filters that have not been disabled, an acceptable list of filters that are desired for a proper operation of the multimedia application and an unacceptable list of filters that are unsuitable for the multimedia application, said acceptable list of filters and unacceptable list of filters being updated each time a report is received from the user, said unacceptable list supporting a range of version identifiers for each filter that is unsuitable for the multimedia application, said generating further comprising signing said acceptable and unacceptable list of filters with a private key and embedding a public key corresponding to said private key in the multimedia application.

2. The method of claim 1 further comprising maintaining a performance history of each of the identified list of filters, said performance history relating to each of the identified filters with respect to at least one user of the multimedia application and disabling a filter likely to cause problems as indicated by the performance history.

3. The method of claim 2 wherein determining if the one or more filters are suitable for the multimedia application comprises one or more of the following: determining if the one or more filters are suitable for the multimedia application based on the maintained performance history or based on whether a filter has been previously encountered; and
   employing a statistical analysis of the maintained performance history to determine if the one or more filters are suitable for the multimedia application.

4. The method of claim 2, wherein the performance history of each filter comprises a filter loading time, and disabling further comprises disabling the filter based on its filter loading time.

5. The method of claim 1 further comprising:
   presenting the unacceptable list of filters to the user via a user interface, said user interface initially indicating that the unacceptable list of filters are disabled in the multimedia application by default, said presenting comprising presenting a current version for each filter of the unacceptable list of filters; and
   receiving a selection from the user for managing the unacceptable list of filters.

6. The method of claim 1 further comprising:
   presenting to a user via a user interface a filter that has been used by the multimedia application, said user interface initially indicating that the filter is enabled in the multimedia application by default, and
   receiving a selection from the user for managing the filter.

7. The method of claim 1 wherein disabling the one or more filters comprises disabling the one or more filters in response to informing a user of the multimedia application that the one or more filters are to be disabled.

8. The method of claim 1 further comprising receiving a selection from a user of the multimedia application for enabling the disabled one or more filters.

9. One or more computer-readable storage media having the computer-executable instructions recited in claim 1.

10. A system for managing multimedia filters for providing multimedia filter resiliency to a multimedia application, said system comprising:
    a memory storage area for storing data regarding a list of filters, said memory storage area being configured to maintain a performance history of each of the list of filters; and
    a processor executing a multimedia application for determining, based on the maintained performance history, if one or more filters of the list of filters are suitable for execution, said one or more filters capable of performing one or more of the following functions on multimedia data: accepting, reading, processing and rendering, said multimedia application being configured to interrupt an interface call for loading the one or more filters in response to a user executing the multimedia application, wherein the maintained performance history of each filter of the list of filters comprises information on whether the filter causes the multimedia application to malfunction, wherein the multimedia application is configured to disable the one or more filters if the one or more filters are determined to be unsuitable for execution as indicated by the performance history, said disabling preventing selection of the disabled one or more filters for constructing a filter graph; and
    a user interface for receiving a report from a user of the multimedia application on a performance of a filter, said report is stored in the memory storage area as the performance history of the filter, wherein the memory storage area is configured to store an acceptable list of filters that are desired for a proper operation of the multimedia application and an unacceptable list of filters that are unsuitable for the multimedia application, said unacceptable list supporting a range of version identifiers for each filter that is unsuitable for the multimedia application, said acceptable list of filters and said unacceptable list of filters being generated based on the received report, said acceptable list of filters and said unacceptable list of filters being digitally signed with a private key, said multimedia application having a public key corresponding to said private key associated therewith.

11. The system of claim 10 wherein the multimedia application is configured to employ a statistical analysis of the maintained performance history to determine if the one or more filters are suitable for execution.

12. The system of claim 10 further comprising computer-executable instructions to update the acceptable list of filters and the unacceptable list of filters each time the report is received from the user.

13. The system of claim 10 wherein the user interface is configured for presenting the unacceptable list of filters to the user and receiving a selection from the user for managing the unacceptable list of filters, and wherein the user interface is further configured to present a current version for each filter of the unacceptable list of filters, said unacceptable list of filters initially being presented in the user interface as disabled by default.

14. The system of claim 10 further comprising a user interface to present to a user a filter that has been used by the multimedia application and to receiving a selection from the user for managing the filter, said filter initially being presented in the user interface as enabled by default.

15. The system of claim 10 wherein the multimedia application is configured to disable the one or more filters in response to informing a user that the one or more filters are to be disabled.

16. The system of claim 10 further comprising a user interface for receiving a selection from a user of the multimedia application for enabling the disabled one or more filters.

17. The system of claim 10, wherein the performance history of each filter comprises a filter loading time, and disabling further comprises disabling the filter based on its filter loading time.

18. One or more computer-readable storage media having computer-executable components for managing multimedia filters for providing multimedia filter resiliency to a multimedia application, said computer-readable media comprising:
a memory component for storing data regarding a list of filters, said memory component further configured to maintain a performance history of each of the list of filters; and
an application component for determining, based on the maintained performance history, if one or more filters of the list of filters are suitable for execution, said list of filters comprising filters capable of performing one or more of the following functions on multimedia data: accepting, reading, processing and rendering, said multimedia application configured to interrupt an interface call for loading the one or more filters in response to a user executing a multimedia application;
wherein the maintained performance history of each filter of the list of filters comprises information on whether the filter causes the multimedia application to malfunction,
wherein the application component is configured to disable the one or more filters if the one or more filters are determined to be unsuitable for execution as indicated by the performance history, said disabling preventing selection of the disabled one or more filters for constructing a filter graph; and
an interface component for receiving a report from a user of the application component on a performance of a filter, said report is stored by the memory component as the performance history of the filter, wherein the memory component is configured to store an acceptable list of filters that are desired for a proper operation of the application component and an unacceptable list of filters that are unsuitable for the application component, said unacceptable list supporting a range of version identifiers for each filter that is unsuitable for the multimedia application, said acceptable list of filters and said unacceptable list of filters being generated based on the received report, said acceptable list of filters and said unacceptable list of filters being digitally signed with a private key, said multimedia application having a public key corresponding to said private key associated therewith.

19. The computer-readable storage media of claim 18 wherein the application component is configured to employ a statistical analysis of the maintained performance history of a plurality of users to determine if the one or more filters are suitable for execution.

20. The computer-readable storage media of claim 18 wherein the interface component is configured to present the unacceptable list of filters to the user and to receive a selection from a user for managing the unacceptable list of filters, and wherein the interface component is further configured to present a current version for each filter of the unacceptable list of filters, said unacceptable list of filters initially being presented in the interface component as disabled by default.

21. The computer-readable storage media of claim 18 further comprising an interface component for presenting to a user a filter that has been used by the application component and for receiving a selection from the user for managing the filter, said filter initially being presented in the interface component as enabled by default.

22. The computer-readable storage media of claim 18 wherein the application component is configured to disable the one or more filters in response to informing a user that the one or more filters are to be disabled.

23. The computer-readable storage media of claim 18 further comprising an interface component for receiving a selection from a user of the application component for enabling the disabled one or more filters.

24. The computer-readable storage media of claim 18, wherein the performance history of each filter comprises a filter loading time, and disabling further comprises disabling the filter based on its filter loading time.

25. A method of managing multimedia filters for providing filter resiliency to a multimedia application, said method comprising:
intercepting an interface call for loading filters in response to a user executing the multimedia application;
identifying a list of filters associated with the multimedia application, each filter having one or more version identifiers;
determining whether one or more filters of the identified list of filters are suitable or unsuitable for the multimedia application, said one or more filters capable of performing one or more of the following functions on multimedia data: accepting, reading, processing and rendering;
presenting the determined one or more filters to a user of the multimedia application, said presenting further comprising:
presenting a GUID, an executable path and a current version number of the one or more version identifiers for each filter;
presenting filters that are deemed unsuitable for the multimedia application as disabled; and
presenting filters that have been previously used by the multimedia application as enabled;
receiving a selection from the user for managing the presented one or more filters, wherein the one or more filters determined to be unsuitable are prevented from being selected for construction of a filter graph;
receiving from a user of the multimedia application a report on a performance of a filter as a performance history of the filter, said report comprising information on whether the filter causes the multimedia application to malfunction; and
generating, based on the received report and based on the identified filters that have not been disabled, an acceptable list of filters that are desired for a proper operation of the multimedia application and an unacceptable list of filters that are unsuitable for the multimedia application, said acceptable list of filters and unacceptable list of filters being undated each time a report is received from the user, said unacceptable list supporting a range of version identifiers for each filter that is unsuitable for the multimedia application, said generating further comprising signing said acceptable and unacceptable list of filters with a private key and embedding a public key corresponding to said private key in the multimedia application.

26. The method of claim 25 wherein presenting the determined one or more filters to the user comprises presenting the one or more filters to the user via a user interface, and wherein receiving a selection comprises receiving a selection from the user for managing the presented one or more filters via the user interface.

27. The method of claim 25 wherein receiving a selection from the user for managing the presented one or more filters comprises receiving a selection from the user for enabling or disabling the presented one or more filters in the multimedia application.

28. The method of claim 25 wherein identifying the list of filters associated with the multimedia application comprises identifying one or more of the following associated with the multimedia application: a source filter, a splitter transform filter, a codec transform filter, and a renderer filter.

29. A system for managing multimedia filters for providing multimedia filter resiliency to a multimedia application, said system comprising:
   a processor executing a multimedia application for processing multimedia data,
   a memory storage area for storing data regarding a list of filters associated with the multimedia application,
   said processor executing a filter graph manager for constructing a filter graph pipeline from the list of filters in response to a user executing the multimedia application, said list of filters comprising one or more filters capable of performing one or more of the following functions on multimedia data: accepting, reading, processing and rendering, said filter graph pipeline being implemented in a process separate from the multimedia application, and
   said processor executing a user interface for presenting one or more filters of the list of filters to the user, said user interface further presenting a GUID, an executable path and a current version number for uniquely identifying each of the presented one or more filters, said user interface further presenting, for each of the one or more filters, whether the one or more filters is suitable or unsuitable for the multimedia application, said user interface further being configured to receive a selection from the user for managing the presented one or more filters,
   wherein the one or more filters determined to be unsuitable are prevented from being selected for construction of a filter graph, and wherein the multimedia application is configured to intercept an interface call made by the filter graph manager to the memory storage area for loading a filter to the filter graph;
   wherein the user interface receives from a user of the multimedia application a report on a performance of a filter as a performance history of the filter, said report comprising information on whether the filter causes the multimedia application to malfunction; and
   wherein, based on the received report and based on the identified filters that have not been disabled, the user interface generates an acceptable list of filters that are desired for a proper operation of the multimedia application and an unacceptable list of filters that are unsuitable for the multimedia application, said acceptable list of filters and unacceptable list of filters being updated each time a report is received from the user, said unacceptable list supporting a range of version identifiers for each filter that is unsuitable for the multimedia application, said acceptable and unacceptable list of filters signed with a private key and having an embedded public key corresponding to said private key in the multimedia application.

30. The system of claim 29 wherein the multimedia application is configured to determine that the filter is unsuitable for the multimedia application and to prevent the interface call from communicating with the memory area, and wherein in response, the filter graph manager is configured to load another filter included in the list of filters for constructing the filter graph.

31. The system of claim 29 wherein the memory area is configured to store a list of filters that have been used by the multimedia application, wherein the multimedia application is configured to determine that the filter is suitable for the multimedia application, wherein in response, the filter graph manager is configured to load the filter for constructing the filter graph, and wherein in response, the multimedia application is configured to access the memory area for adding the filter to the list of filters that have been used by the multimedia application.

32. The system of claim 29 wherein the user interface is configured to present to the user:
   a filter that has been identified as unsuitable for the multimedia application, wherein the multimedia application is configured to initially disable the unsuitable filter by default, and wherein the user interface is configured to allow the user to enable the filter that has been disabled by default; and
   a filter that has been used by the multimedia application, wherein the multimedia application is configured to initially enable the used filter by default, and wherein the user interface is configured to allow the user to disable the filter that has been enabled by default.

* * * * *

UNITED STATES PATENT AND TRADEMARK OFFICE
CERTIFICATE OF CORRECTION

PATENT NO. : 7,640,552 B2
APPLICATION NO. : 10/976562
DATED : December 29, 2009
INVENTOR(S) : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Ninth Day of November, 2010

David J. Kappos
*Director of the United States Patent and Trademark Office*